(12) United States Patent
Lopez et al.

(10) Patent No.: US 11,362,534 B2
(45) Date of Patent: Jun. 14, 2022

(54) BATTERY WITH SWITCHED ACCUMULATORS

(71) Applicant: Commissariat à l'Énergie Atomique et aux Énergies Alternatives, Paris (FR)

(72) Inventors: Yan Lopez, Renage (FR); Eric Fernandez, Saint Paul de Varces (FR); Sylvain Bacquet, Chasselay (FR); Léandro Cassarino, Talence (FR); Ghislain Despesse, Voreppe (FR); Rémy Thomas, Echirolles (FR)

(73) Assignee: Commissariat à l'Énergie Atomique et aux Énergies Alternatives, Paris (FR)

( * ) Notice: Subject to any disclaimer, the term of this patent is extended or adjusted under 35 U.S.C. 154(b) by 22 days.

(21) Appl. No.: 16/772,103

(22) PCT Filed: Dec. 6, 2018

(86) PCT No.: PCT/FR2018/053145
§ 371 (c)(1),
(2) Date: Jun. 11, 2020

(87) PCT Pub. No.: WO2019/115916
PCT Pub. Date: Jun. 20, 2019

(65) Prior Publication Data
US 2020/0335982 A1    Oct. 22, 2020

(30) Foreign Application Priority Data

Dec. 12, 2017    (FR) ...................................... 1761991

(51) Int. Cl.
*H02J 7/00*    (2006.01)

(52) U.S. Cl.
CPC ............ *H02J 7/007* (2013.01); *H02J 7/0013* (2013.01); *H02J 7/0024* (2013.01); *H02J 7/0031* (2013.01)

(58) Field of Classification Search
CPC ........ H02J 7/007; H02J 7/0013; H02J 7/0024; H02J 7/0031
(Continued)

(56) References Cited

U.S. PATENT DOCUMENTS

| | | | |
|---|---|---|---|
| 9,450,274 B2 * | 9/2016 | Vo .......................... | H02J 7/0021 |
| 2002/0041502 A1 * | 4/2002 | Ulinksi ..................... | H02J 3/32 |
| | | | 363/37 |

(Continued)

FOREIGN PATENT DOCUMENTS

EP    2 681 798 B1    10/2018

OTHER PUBLICATIONS

International Search Report and Written Opinion for International Application No. PCT/FR2018/053145, dated Mar. 15, 2019.

(Continued)

*Primary Examiner* — Edward Tso
*Assistant Examiner* — Aaron Piggush
(74) *Attorney, Agent, or Firm* — Wolf, Greenfield & Sacks, P.C.

(57) ABSTRACT

A battery including: a power supply bus; an assembly of electric cells and of first switches coupling the cells; second switches forming an H bridge and coupling said assembly to nodes; a first circuit for supplying first control signals to the first and second switches; a second circuit for delivering a first power supply voltage to the first circuit based on the voltage across one of the cells; a third circuit for supplying second control signals to at least two of the second switches and connected to the power supply bus; and first diodes coupling the first circuit to the two second switches and (Continued)

second diodes coupling the third circuit to the two second switches.

8 Claims, 3 Drawing Sheets

(58) Field of Classification Search
USPC ............... 320/121, 122, 134, 136, 158, 163
See application file for complete search history.

(56) References Cited

U.S. PATENT DOCUMENTS

| | | |
|---|---|---|
| 2013/0093396 A1 | 4/2013 | Dien |
| 2013/0121042 A1* | 5/2013 | Gan ..................... H02M 7/49 363/37 |
| 2014/0015488 A1 | 1/2014 | Despesse |
| 2014/0287278 A1* | 9/2014 | Despesse ............ B60L 15/007 429/7 |
| 2017/0054306 A1 | 2/2017 | Vo et al. |

OTHER PUBLICATIONS

International Preliminary Report on Patentability for International Application No. PCT/FR2018/053145, dated Jun. 25, 2020.

* cited by examiner

BATTERY WITH SWITCHED ACCUMULATORS

This application is a national stage filing under 35 U.S.C. & 371 of International Patent Application Serial No. PCT/FR2018/053145, filed Dec. 6, 2018, which claims priority to French patent application FR17/61991. The contents of these applications are incorporated herein by reference in their entirety.

BACKGROUND

The present disclosure relates to the field of batteries with switched cells or accumulators.

DISCUSSION OF THE RELATED ART

A switched cell battery is a battery comprising a plurality of generally identical modules connected in series and/or in parallel, having their number depending on the desired voltage across the battery. Each module comprises a plurality of electric cells or accumulators. Switches connected in series and in parallel with the cells enable to couple or not in series and/or in parallel each cell between the output nodes of the module, to select the output voltage among the different combinations of the voltages supplied by the cells.

Each battery module comprises a switch control circuit. The control circuit is capable of selecting the cells to be coupled between the output nodes according to various criteria, for example, the desired output voltage or the charge level of each cell. The control circuit may control a driver circuit capable of supplying the control signals adapted to the switches. The control circuit may further be coupled to sensors, for example, sensors of the cell temperature, sensors of the voltages across the cells, etc. The control circuit, the driver circuit, and the sensors are powered with a power supply voltage which is preferably referenced to the module ground. A possibility is for the module power supply voltage to be supplied by a cell of the module connected to ground. A disadvantage of such a battery is that if the cell supplying the power supply voltage is discharged or if it undergoes a failure causing a significant drop in the power supply voltage, the control circuit and the driver circuit are no longer powered and the cells can no longer be switched.

Another possibility is for the power supply voltage to be capable of being supplied by a cell of the module among a plurality of cells referenced to different potentials via galvanic isolation DC voltage-to-DC voltage converters, also called galvanic isolation DC/DC converters. A disadvantage is that, for each cell taking part in the delivery of the power supply voltage, a galvanic isolation DC/DC converter capable of supplying the maximum power required by the control circuit, the driver circuit, and the module sensors, should be provided. The DC/DC converter assembly may have a significant manufacturing cost.

Another possibility is for the power supply voltages of the modules to be delivered by a common power source external to the modules via galvanic isolation DC/DC converters. A disadvantage is that, for each module, the galvanic isolation DC/DC converter should be capable of supplying the maximum power required by the control circuit, the driver circuit, and the module sensors. Such a DC/DC converter may have a significant manufacturing cost.

SUMMARY

Thus, an object of an embodiment is to at least partly overcome the disadvantages of the previously-described switched cell batteries.

Thus, an embodiment provides a switched cell battery comprising:
a power supply bus;
an assembly of electric cells and of first switches coupling the cells together; second switches forming an H bridge and coupling said assembly to nodes;
a first circuit for supplying first control signals to the first switches and to the second switches;
a second circuit for delivering a first power supply voltage to the first circuit based on the voltage across one of the cells;
a third circuit for supplying second control signals to at least two of the second switches and connected to the power supply bus; and
first diodes coupling the first circuit to said at least two of the second switches and second diodes coupling the third circuit to said at least two of the second switches.

According to an embodiment, the third circuit comprises an isolated converter of a DC voltage into a DC voltage coupled to the power supply bus and capable of delivering a second power supply voltage.

According to an embodiment, the battery comprises a fourth circuit powered from the second power supply voltage and capable of controlling the first circuit.

According to an embodiment, the third circuit comprises a third switch between the isolated converter and the second diodes, the third switch being controlled by the fourth circuit.

According to an embodiment, the fourth circuit is capable of controlling the activation or the deactivation of the second circuit.

According to an embodiment, the battery comprises sensors powered from the second power supply voltage.

An embodiment also provides a method of use of a battery such as previously defined, comprising the steps of:
detecting the failure of said one of the cells;
deactivating the second circuit; and
controlling said at least two of the second switches with the second control signals.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION

Figure 1:
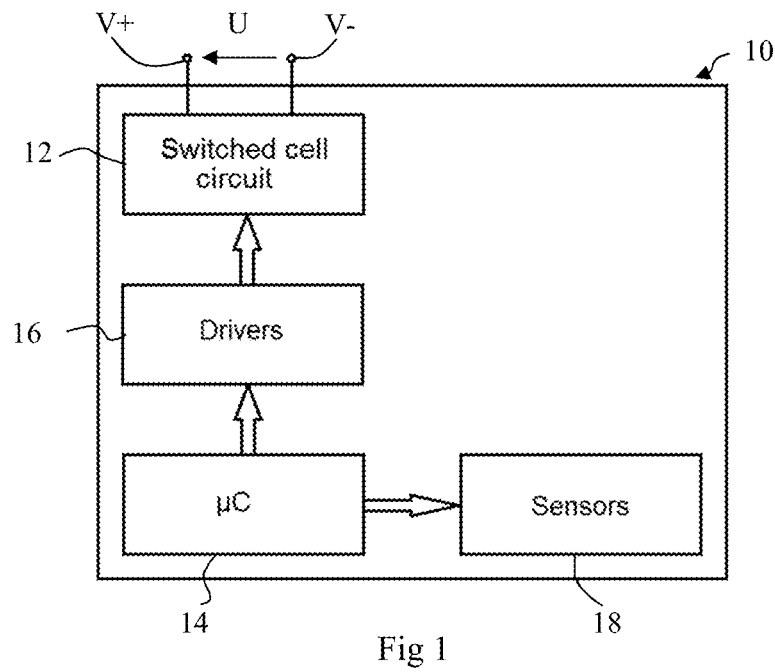
FIG. 1 partially and schematically shows a module of a switched cell battery.

The same elements have been designated with the same reference numerals in the various drawings and, further, the various drawings are not to scale. For the sake of clarity, only the elements that are useful for an understanding of the embodiments described herein have been illustrated and described in detail. Unless otherwise specified, the term "substantially" means within 10%, preferably within 5%, of the value in question.

Unless otherwise specified, when reference is made to two elements connected together, this means that the two elements are directly connected with no intermediate element other than conductors, and when reference is made to two elements coupled together, this means that the two elements may be directly coupled (connected) or coupled via one or a plurality of other elements.

When reference is made to the state of a switch or of a transistor, it is spoken of the on state or of the off state. When reference is made to the voltage of a point or of a node, it is considered that it is the voltage between the point or node and the ground.

Further, a signal which alternates between a first constant state, for example, a low state, noted "0", and a second constant state, for example, a high state, noted "1", is called "binary signal". The high and low states of different binary signals of a same electronic circuit may be different. In particular, the binary signals may correspond to voltages or to currents which may not be perfectly constant in the high or low state.

An embodiment of a method of controlling systems with switched cells will be described in the case of a switched cell battery for which the cells correspond to switched cells or accumulators. However, the present embodiments apply to any type of system with switched cells capable of supplying a variable voltage to a load. Each cell of the system with switched cells may correspond to an electric charge storage element or to an electric generator. An example of an electric charge storage element for example is an electric cell or a capacitor. An example of an electric generator is for example a fuel cell, a zinc-air cell, a photovoltaic cell, or a power recovery system, particularly a small wind power plant or a mini-turbine. The system switch switched cells may comprise electric charge storage elements only, electric generators only, or both electric charge storage elements and electric generators. When the system with switched cells comprises electric generators only, the use is theoretically is discharge mode only. However, in case of a reactive power, for brief passages through a negative power at each period, the inertia of the generator may be sufficient to smooth the power, for example, due to the rotation inertia and to the stray capacitances. Further, each generator may be connected in parallel with a resistive element, to accept negative powers, by dissipating this energy. In operation, the system is intended to be coupled to a device which absorbs or supplies power according to the envisaged application. As an example, this device corresponds to an electric machine, for example, to an electric motor, or to the electric distribution system. FIG. 1 schematically shows a switched cell battery module 10 comprising output nodes V+ and V−. Module 10 comprises a switched cell circuit 12 comprising electric cells and switches and capable of supplying a voltage U between output nodes V+ and V−. Module 10 further comprises a control circuit 14 (µC) capable of selecting the cells to be coupled between output nodes V+ and V− according to various criteria, for example, the desired output voltage U and/or the charge level of each cell. Control unit 14 may comprise a dedicated circuit and/or a processor (particularly a microprocessor or a microcontroller) capable of executing instructions of a computer program stored in the memory. Module 10 further comprises a driver circuit 16 (Drivers) controlled by control circuit 14 and capable of supplying signals capable of controlling the turning-on/turning-off of the switches of circuit 12. Control circuit 14 may further be coupled to sensors 18 capable of measuring at least one characteristic of at least some of the cells, preferably of each cell, for example, the voltage delivered by the cell, its current, or its temperature, and of supplying these measurements to control circuit 14.

Figure 2:
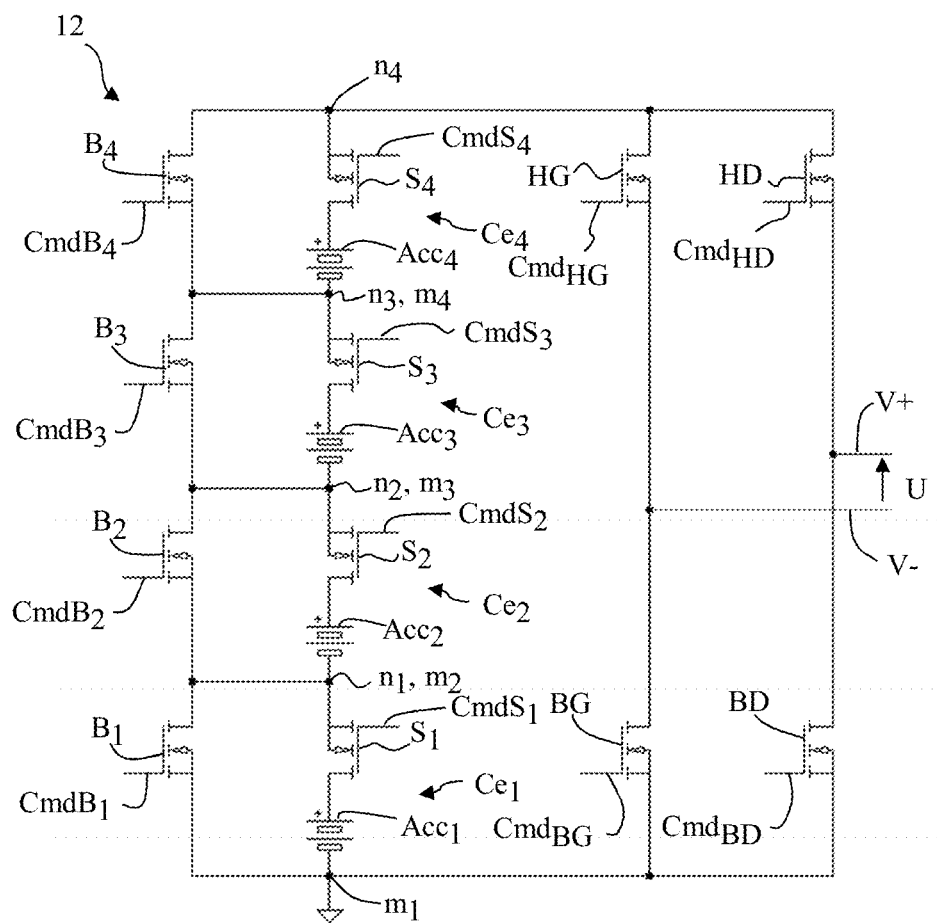
FIG. 2 shows a more detailed embodiment of certain elements of the module of FIG. 1.

FIG. 2 shows a more detailed embodiment of the switched cell circuit 12 of FIG. 1.

Circuit 12 comprises N units $Ce_i$, N being an integer and i varying from 1 to N. In the example of FIG. 2, N is equal to 4. Each unit $Ce_i$ comprises nodes $m_i$ and $n_i$. The node $n_i$ of unit $Ce_i$ is connected to the node $m_{i+1}$ of unit $Ce_{i+i}$, for i varying from 1 to N−1. The node $m_1$ of unit $Ce_1$ is connected to the module ground. Each unit $Ce_i$ comprises an accumulator $Acc_i$ series-connected by the cathode to a transistor $S_i$ between nodes $m_i$ and $n_i$, the anode of accumulator $Ce_i$ being connected to node $m_i$. The anode of accumulator $Acc_i$ is thus connected to node $m_1$ and to ground. Each unit $Ce_i$ also comprises a transistor $B_i$ connected between nodes $m_i$ and $n_i$, in parallel with the assembly comprising accumulator $Acc_i$ and transistor $S_i$. Transistors $S_i$ and $B_i$ have the function of switches and are respectively controlled by control signals $CmdS_i$ and $CmdB_i$. In the present embodiment, transistors $S_i$ and $B_i$ are N-channel MOS transistors.

Node $n_N$, here $n_4$, is coupled to output node V− of module 10 by a switch HG, for example, a transistor, controlled by a control signal CmdHG. Node $n_N$ is coupled to output node V+ of module 10 by a switch HD, for example, a transistor, controlled by a control signal CmdHD. Node $m_1$ is coupled to the output node V− of module 10 by a switch BG, for example, a transistor, controlled by a control signal CmdBG. Node $m_1$ is coupled to the output node V+ of module 10 by a switch BD, for example, a transistor, controlled by a control signal CmdBD. Transistors HD, HG, BD, and BG form an H bridge. In the present embodiment, transistors HD, HG, BD, and BG are N-channel MOS transistors.

Control signals CmdHG, CmdHD, CmdBG, CmdBD, $CmdS_i$, and $CmdB_i$ are powered by driver circuit 16. For unit $Ce_i$, with i varying from 1 to N, control signals $CmdS_i$ and $CmdB_i$ are such that when transistor $S_i$ is on, transistor $B_i$ is off and conversely. Thus, the voltage between node $m_i$ and node $n_i$ is either zero, if $B_i$ is on, or substantially equal to the voltage supplied by accumulator $Acc_i$ if transistor $S_i$ is on. The voltage between nodes $m_1$ and $n_N$ is thus substantially equal to a combination of the voltages delivered by the different accumulators $Acc_i$ of units $Ce_i$.

The control signals of transistors HG, HD, BG, and BD are supplied by driver circuit 16, so that transistors HG, HD, BG, BD have at least two possible configurations. In a first configuration, transistors HD and BG are on and transistors HG and BD are off. Thus, the voltage at output node V+ is substantially equal to the voltage of node $n_N$ and the voltage at output node V− is substantially equal to the voltage of node $m_1$. In a second configuration, transistors HD and BG are off and transistors HG and BD are on. Thus, the voltage at output node V− is substantially equal to the voltage of node $n_N$ and the voltage at output node V+ is substantially equal to the voltage of node $m_1$. The two configurations deliver opposite voltages between nodes V+ and V−.

In operation, if the failure of one of cells $Acc_i$ is detected, control circuit 14 can modify the state of transistors $S_i$ and $B_i$ to no longer use the cell.

Control circuit 14 and driver circuit 16 are for example powered by one of the cells of the module. The power supply voltage of control circuit 14 and of driver circuit 16 being preferably referenced to ground, the power supply voltage of control circuit 14 and of driver circuit 16 may be delivered by cell $Acc_1$.

If accumulator $Acc_1$ undergoes a failure causing a significant drop in the voltage supplied to the control circuit, control circuit 14 and driver circuit 16 can then no longer be powered.

Figure 3:
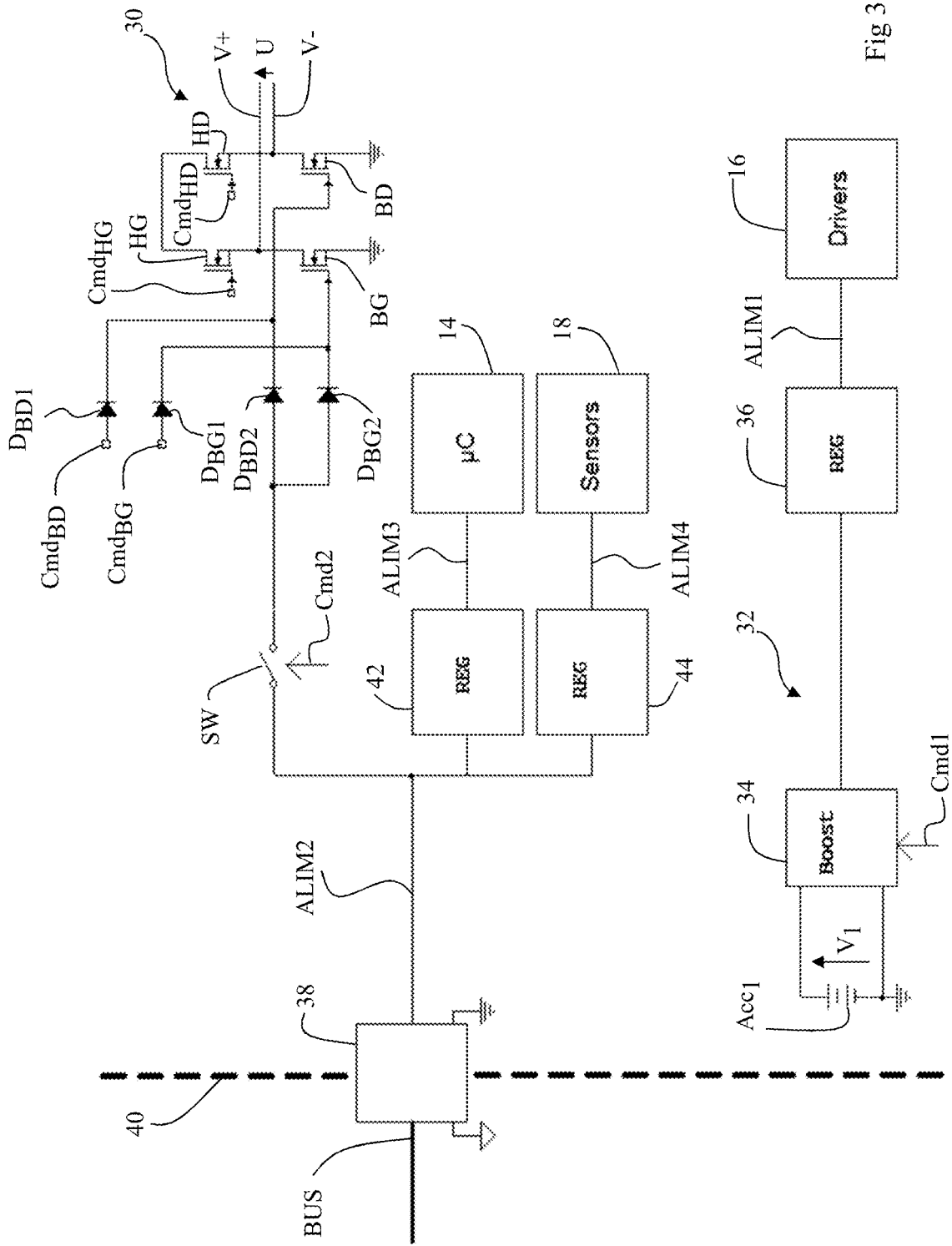
FIG. 3 partially and schematically shows an embodiment of a module of a switched cell battery.

FIG. 3 partially and schematically shows an embodiment of a module 30 of a switched cell battery. Module 30 comprises all the elements of the previously-described module 10, only transistors HG, HD, BG, and BD, cell $Acc_1$, control circuit 14, driver circuit 16, and sensors 18 being shown in FIG. 3.

Module 30 comprises a circuit 32 for delivering a power supply voltage ALIM1 based on the voltage across one of the cells of module 30. Preferably, since the power supply voltage ALIM1 has to be referenced to ground, power supply voltage ALIM1 is delivered by power supply circuit 32 based on the voltage $V_1$ across cell $Acc_1$. According to an embodiment, power supply circuit 32 comprises a boost circuit 34 receiving the voltage $V_1$ across cell $Acc_1$ and controlled by a signal Cmd1, and a voltage regulation circuit 36 (REG) receiving the voltage delivered by boost circuit 34 and delivering voltage ALIM1. Control signal Cmd1 is supplied by control circuit 14. As an example signal Cmd1 is a binary signal. When control signal Cmd1 is in a first state, for example, the high state, circuit 34 is activated and power supply circuit 32 delivers voltage ALIM1. When control signal Cmd1 is in a second state, for example, the low state, circuit 34 is deactivated and power supply circuit 32 no longer delivers a power supply voltage.

According to an embodiment, power supply voltage ALIM1 is used for the powering of driver circuit 16 only.

Module 30 further comprises a galvanic isolation DC/DC voltage converter 38 coupled to a power supply bus BUS and delivering a voltage ALIM2 based on the voltage delivered by power supply bus BUS. Power supply bus BUS does not form part of module 30, the physical limit of module 30 being schematically shown in FIG. 3 by a dashed line 40. Power supply bus BUS may be coupled to each module 30 of the battery.

Module 30 comprises a voltage regulation circuit 42 (REG) coupled to converter 38 and delivering a power supply voltage ALIM3 to control circuit 14. Module 30 further comprises a voltage regulation circuit 44 (REG) coupled to converter 38 and delivering a power supply voltage ALIM4 to sensors 18.

Module 30 comprises a diode $D_{BD1}$ having its anode coupled to driver circuit 16 and receiving signal $Cmd_{BD}$ and having its cathode coupled to the gate of transistor BD. Module 30 further comprises a diode $D_{BD2}$ having its anode coupled to converter 38 via a switch SW and having its cathode coupled to the gate of transistor BD.

Module 30 comprises a diode $D_{BG1}$ having its anode coupled to driver circuit 16 and receiving signal $Cmd_{BG}$ and having its cathode coupled to the gate of transistor BG. Module 30 further comprises a diode $D_{BG2}$ having its anode coupled to converter 38 via a switch SW and having its cathode coupled to the gate of transistor BG.

Switch SW is controlled by a signal Cmd2. Control signal Cmd2 is supplied by control circuit 14. As an example, signal Cmd2 is a binary signal. When control signal Cmd2 is in a first state, for example, the high state, switch SW is on and when control signal Cmd2 is in a second state, for example, the low state, switch SW is off. Switch SW may be coupled by a MOS transistor. According to an embodiment, signals Cmd1 and Cmd2 may be complementary.

Diodes $D_{BD1}$ and $D_{BD2}$ form a first block implementing logic function OR. Thus, the voltage at the gate of transistor BD, forming the output of the first block, is substantially equal to the highest voltage among the voltages at the anodes of diodes $D_{BD1}$ and $D_{BD2}$, forming the inputs of the first block.

Diodes $D_{BG1}$ and $D_{BG2}$ form a second block implementing logic function OR. Thus, the voltage at the gate of transistor BG, forming the output of the second block, is substantially equal to the highest voltage among the voltages at the level of the anodes of diodes $D_{BG1}$ and $D_{BG2}$, forming the inputs of the second block.

Power supply voltage V1 is for example in the range from 1 V to 4V according to the type of cell $Acc_1$, for example, equal to approximately 2 V or 3.6 V. The voltage delivered by boost circuit 34 is for example in the range from 2 V to 4 V, for example equal to approximately 3.8 V. Power supply voltage ALIM1 is for example in the range from 2 V to 4 V, for example, equal to approximately 3.3 V. The control signals supplied by control circuit 14 to driver circuit 16 may be binary signals alternating between a first level, for example, 0 V and a second level, for example, 3.3 V. The voltage delivered by power supply bus BUS may be in the range from 4 V to 30 V, for example, equal to 5 V, 12 V, or 24 V. The voltage ALIM2 delivered by converter 38 may be in the range from 4 V to 30 V, for example, equal to 5 V, 12 V, or 24 V. Preferably, voltage ALIM2 is in the range from 4 V to 5 V, which enables to have little losses for the power supply of control circuit 14 while enabling to properly turn on switch SW, particularly when switch SW corresponds to a power switch.

Figure 4:
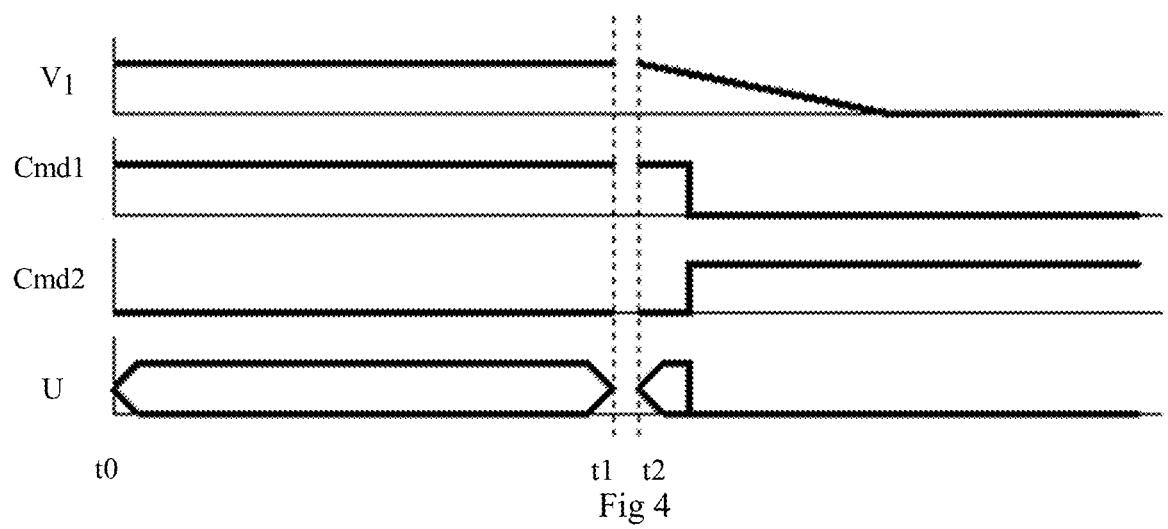
FIG. 4 is a timing diagram illustrating the operation of the battery module according to the embodiment of FIG. 3.

FIG. 4 shows a timing diagram illustrating the operation of battery module 30 according to the embodiment of FIG. 3. Times t0, t1, and t2 are successive times.

According to an embodiment, when cell $Acc_1$ operates normally (from time t0 to time t1 in FIG. 4), control circuit 14 supplies signal Cmd1 in the high state so that circuit 34 is activated and control circuit 14 supplies signal Cmd2 in the low state so that switch SW is off. Driver circuit 16 is then powered with voltage ALIM1 and switches BG and BD receive at their gate respectively signals $Cmd_{BG}$ and $Cmd_{BD}$. The voltage U delivered by module 30 then depends on control signals $Cmd_{HG}$, $Cmd_{HD}$, $Cmd_{BG}$, and $Cmd_{BD}$.

FIG. 4 shows a failure of cell $Acc_1$ from time t2 as a decrease in voltage $V_1$. Control circuit 14 is capable of detecting the failure of cell $Acc_1$ and/or of driver circuit 16. As an example, control circuit 14 may detect that voltage V1 decreases below a given threshold. Control circuit 14 then supplies signal Cmd1 in the low state so that circuit 34 is deactivated and control circuit 14 supplies signal Cmd2 in the high state so that switch SW is on. Driver circuit 16 is then no longer powered and switches BG and BD receive voltage ALIM2 at their gate. Driver circuit 16 no longer being powered, control signals $Cmd_{HG}$, $Cmd_{HD}$, $Cmd_{BG}$, and $Cmd_{BD}$ are in the low state. Transistors HD and HG are thus off. Since the gates of transistors HD and HG receive voltage ALIM2, transistors BD and BG are on. Voltage U is thus substantially zero.

An advantage of the embodiment of module 30 is that converter 38 is not used to power driver circuit 16 but only to power control circuit 14, sensors 18 and, in case of a failure of the powering of driver circuit 16, to control the turning—on of switches BG and BD of the H bridge. Converter 38 should thus supply an electric power smaller than that which would be necessary if it had to power driver circuit 16. A converter 38 of low bulk and low manufacturing cost may be used.

Another advantage of the embodiment of module 30 is that, in case of a failure of the power supply of the driver circuit 16 of one of the battery modules, the switches BD and BG of this module are controlled so that voltage U is substantially zero. The battery can then keep on operating. In particular, especially in the case where the modules are series-connected, for conventional modules, the failure of one of the modules causes the stopping of the battery operation while, with the embodiment of module 30, the battery can keep on operating.

Another advantage of the embodiment of module 30 is that the power supply of control circuit 14 and of sensors 18 is different from the power supply of driver circuit 16. This enables to decrease disturbances on the measurements performed by sensors 18.

Specific embodiments have been described. Various alterations and modifications will occur to those skilled in the art. In particular, a specific embodiment of arrangement of electric cells $Acc_i$ and of switches $B_i$ and $S_i$ may be different from what is shown in FIG. 2. However, it should be clear that the arrangement of the electric cells $Acc_i$ and of switches $B_i$ and $S_i$ may be different from what is shown in FIG. 2. As an example, the module cells may be arranged as described in patent application WO 2012117109. Further, the previously-described transistors forming the switches in units may be replaced with other types of switches according to the needs of the circuit.

The invention claimed is:

1. An electric system with switched electric cells comprising:
   a power supply bus;
   an assembly of electric cells and of first switches coupling the electric cells together;
   more than two second switches forming an H bridge and coupling said assembly to output nodes;
   a first circuit which supplies first control signals to the first switches and to the second switches;
   a second circuit which delivers a first power supply voltage to the first circuit based on the voltage across one of the electric cells;
   a third circuit which supplies second control signals to at least two of the second switches and connected to the power supply bus; and
   first diodes coupling the first circuit to said at least two of the second switches and second diodes coupling the third circuit to said at least two of the second switches.

2. A method of use of the electric system according to claim 1, comprising the successive steps of:
   detecting the failure of said one of the electric cells;
   deactivating the second circuit; and
   controlling said at least two of the second switches with the second control signals.

3. The electric system with switched electric cells according to claim 1, wherein the third circuit comprises an isolated converter of a DC voltage into a DC voltage coupled to the power supply bus and configured to deliver a second power supply voltage.

4. The electric system with switched electric cells according to claim 3, comprising sensors powered from the second power supply voltage.

5. The electric system with switched electric cells according to claim 3, comprising a fourth circuit powered from the second power supply voltage and configured to control the first circuit.

6. The electric system with switched electric cells according to claim 5, wherein the fourth circuit is configured to control the activation or the deactivation of the second circuit.

7. The electric system with switched electric cells according to claim 5, wherein the third circuit comprises a third switch between the isolated converter and the second diodes, the third switch being controlled by the fourth circuit.

8. The electric system with switched cells according to claim 7, wherein the fourth circuit is configured to control the activation or the deactivation of the second circuit.

* * * * *